US011566538B2

(12) United States Patent
Scholtes (10) Patent No.: US 11,566,538 B2
(45) Date of Patent: Jan. 31, 2023

(54) INTERNAL TURBOMACHINE CASING HAVING IMPROVED THERMAL INSULATION

(71) Applicant: SAFRAN AIRCRAFT ENGINES, Paris (FR)

(72) Inventor: Christophe Scholtes, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/278,700

(22) PCT Filed: Sep. 17, 2019

(86) PCT No.: PCT/FR2019/052161
§ 371 (c)(1),
(2) Date: Mar. 23, 2021

(87) PCT Pub. No.: WO2020/065178
PCT Pub. Date: Apr. 2, 2020

(65) Prior Publication Data
US 2022/0034236 A1 Feb. 3, 2022

(30) Foreign Application Priority Data
Sep. 24, 2018 (FR) ...................................... 1858681

(51) Int. Cl.
*F01D 25/14* (2006.01)
*B33Y 80/00* (2015.01)
(Continued)

(52) U.S. Cl.
CPC ............ *F01D 25/145* (2013.01); *B33Y 80/00* (2014.12); *F01D 11/122* (2013.01); *F01D 11/18* (2013.01);
(Continued)

(58) Field of Classification Search
CPC ..... F01D 11/122–127; F01D 11/14–24; F01D 25/145
See application file for complete search history.

(56) References Cited

U.S. PATENT DOCUMENTS 4,317,646 A * 3/1982 Steel ....................... F01D 11/18
415/173.1
4,925,365 A * 5/1990 Crozet ...................... F01D 9/04
415/173.6
(Continued)

FOREIGN PATENT DOCUMENTS

EP 0657624 A1 * 6/1995
EP 1059420 A1 12/2000
(Continued)

OTHER PUBLICATIONS

Search Report issued in French Patent Application No. 1858681 dated May 27, 2019.
(Continued)

*Primary Examiner* — Topaz L. Elliott
(74) *Attorney, Agent, or Firm* — Pearne & Gordon LLP (57) ABSTRACT

An internal casing ferrule for a turbomachine, centered on a longitudinal central axis, which includes: a main body centered on this axis, with two ends, delimited by surfaces that are radially inner and outer relative to this axis; a thermal porous-structure insulation envelope having a volumetric porosity ≥50%, which includes: a lateral portion entirely covering the two ends; when viewed in section transversely to this axis, exterior and interior portions entirely covering, respectively, the radially outer and inner surfaces of the main body; and a protective envelope which at least partially covers the envelope and which includes, when viewed in section transversely to this axis, radially
(Continued)

outer and inner protective portions, respectively covering, at least in part, the exterior and interior portions.

13 Claims, 7 Drawing Sheets

(51) Int. Cl.
  *F01D 11/12* (2006.01)
  *F01D 11/18* (2006.01)

(52) U.S. Cl.
  CPC ...... *F05D 2220/32* (2013.01); *F05D 2230/31* (2013.01); *F05D 2240/11* (2013.01); *F05D 2250/282* (2013.01); *F05D 2250/283* (2013.01); *F05D 2260/231* (2013.01); *F05D 2300/514* (2013.01)

(56) References Cited

U.S. PATENT DOCUMENTS

| | | | | |
|---|---|---|---|---|
| 5,174,714 | A * | 12/1992 | Plemmons | F01D 25/145 415/177 |
| 5,195,868 | A * | 3/1993 | Plemmons | F01D 25/145 415/177 |
| 5,330,321 | A * | 7/1994 | Roberts | F01D 11/18 415/138 |
| 5,639,210 | A * | 6/1997 | Carpenter | B60R 25/2063 415/173.3 |
| 6,772,581 | B2 * | 8/2004 | Ojiro | F01D 11/24 415/114 |
| 9,447,696 | B2 * | 9/2016 | McCaffrey | F01D 11/18 |
| 9,726,038 | B2 * | 8/2017 | Bayer | F01D 25/14 |
| 9,771,827 | B2 * | 9/2017 | Stanka | F02C 7/24 |
| 9,976,435 | B2 * | 5/2018 | Borja | F01D 5/02 |
| 10,138,745 | B2 | 11/2018 | Scholtes | |
| 10,189,226 | B1 * | 1/2019 | Kolodziejska | B29C 35/08 |
| 10,273,967 | B2 | 4/2019 | Scholtes et al. | |
| 2001/0023581 | A1 * | 9/2001 | Ojiro | F01D 11/24 60/39.182 |
| 2014/0186152 | A1 * | 7/2014 | McCaffrey | F01D 11/18 277/543 |
| 2015/0030434 | A1 * | 1/2015 | Stanka | B28B 1/001 264/308 |
| 2016/0177768 | A1 * | 6/2016 | Borja | F01D 11/18 415/134 |
| 2016/0194762 | A1 * | 7/2016 | Schaedler | C23C 18/1662 428/220 |
| 2016/0230582 | A1 * | 8/2016 | Schlothauer | F01D 11/12 |
| 2016/0237842 | A1 * | 8/2016 | Blaney | F01D 11/18 |
| 2016/0326900 | A1 | 11/2016 | Borja | |
| 2017/0175562 | A1 * | 6/2017 | Giliberti | F01D 5/12 |
| 2018/0209291 | A1 | 7/2018 | Scholtes | |
| 2019/0136707 | A1 * | 5/2019 | Palmer | F01D 25/246 |
| 2019/0186282 | A1 | 6/2019 | Scholtes et al. | |

FOREIGN PATENT DOCUMENTS

| | | |
|---|---|---|
| EP | 1698761 A2 | 9/2006 |
| FR | 2589520 A1 | 5/1987 |
| FR | 2957115 A1 | 9/2011 |

OTHER PUBLICATIONS

International Search Report for issued in Application No. PCT/FR2019/052161 dated Jan. 16, 2020.
Written Opinion for PCT/FR2019/052161 dated Jan. 16, 2020.

* cited by examiner

INTERNAL TURBOMACHINE CASING HAVING IMPROVED THERMAL INSULATION

This is the National Stage of PCT international application PCT/FR2019/052161, filed on Sep. 17, 2019 entitled "INTERNAL TURBOMACHINE CASING HAVING IMPROVED THERMAL INSULATION", which claims the priority of French Patent Application No. 1858681 filed Sep. 24, 2018, both of which are incorporated herein by reference in their entirety.

TECHNICAL FIELD

The present invention relates to the thermal insulation of an internal turbomachine casing (and in particular the internal casings of aircraft turbine engines).

PRIOR ART

The compressors and the turbines of turbomachines conventionally include at least one rotating assembly or rotor generally comprising a plurality of discs. Each rotor disc is provided with a plurality of movable blades and rotates relative to a fixed ferrule that circumferentially surrounds each one of the discs. The set of ferrules facing the blades forms the internal casing of the turbomachine.

Fixed blades (also called "rectifiers", for the compressors, and "distributors", for the turbines) can be inserted between two rotor discs and form a stator, that is integral with the internal casing.

It is necessary to retain a clearance between the tip of a blade of a rotor disc and the ferrule of the internal casing located facing. Ideally, such clearances should be reduced as much as possible in order to improve the performance of the turbomachine. However, the fact that these clearances vary during the operation of the turbomachine must be taken into account.

These variations in clearances are mainly the consequence of mechanical phenomena (due in particular to the deformations of the rotor under centrifugal forces, the effects of the pressures of the flow duct of the gases on the rotor and the stator, the axial displacements, etc.) and thermal phenomena (in a compressor, and in particular in a high-pressure compressor, the parts that form the rotor and the stator generally have different thermal expansion coefficients and especially a different deformation speed due to a different environment; in general, the stator, more ventilated and with a lower mass, reacts more quickly than the disc of the rotor of which the inertia is mainly linked to the mass of the disc root, often with little ventilation, and this difference in "thermal response time" causes a substantial variation in the clearances during operation).

Reducing clearances during operation is a major axis for improving the performance of the turbomachine.

Figure 3:
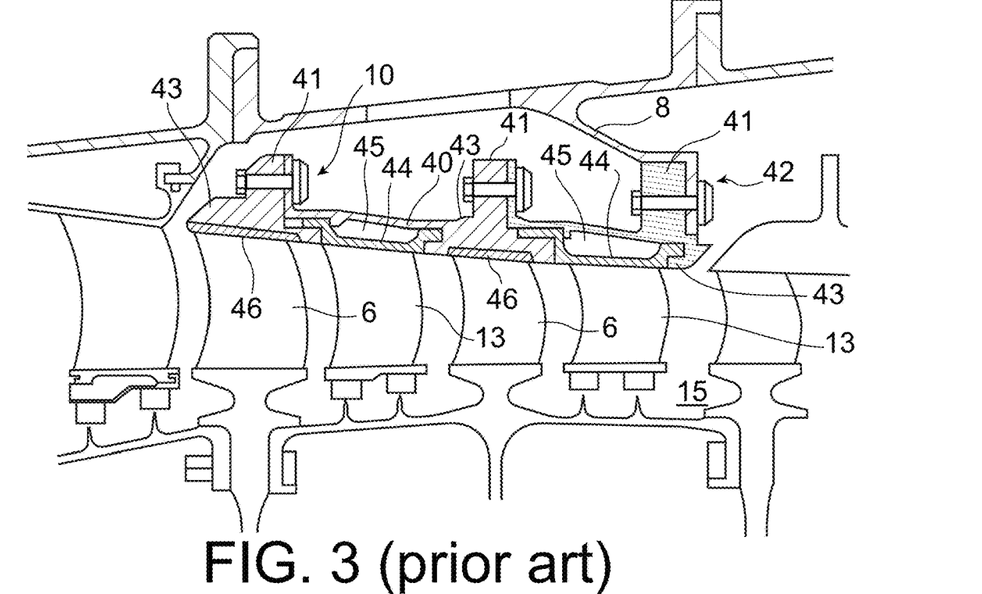
FIGS. 3 and 4 are respectively an enlarged view of the upstream portion (FIG. 3) and of the downstream portion (FIG. 4) of the stator of the compressor of FIG. 2, having a thermal insulation of the internal casing by airgaps according to the prior art.
Figure 4:
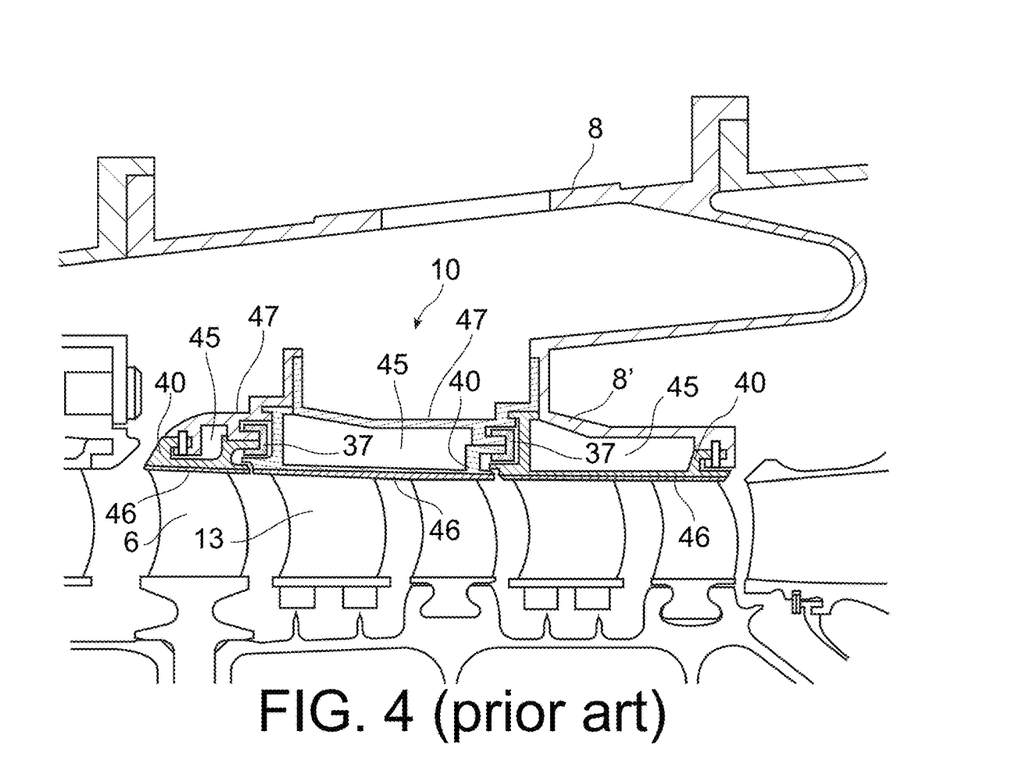

The solutions proposed in the prior art often call upon technologies that make it possible to reduce the "thermal response time" of the internal casing. Most often, the solution proposed consists of equipping the inner wall of the internal casing with annular parts disposed in line with the stators, in such a way as to form one or more airgaps, which will provide the thermal insulation of the internal casing. Recall that an airgap is a closed and narrow annular space, wherein there is air. This solution is for example described in document [1] and is shown in FIGS. 3 and 4, which shall be described in detail hereinafter.

The airgap solution as a means of thermal insulation however requires the use of many parts (the annular parts and fastening parts of the latter), which has an impact on the mass and the cost. There are also mounting constraints and a problem in terms of space.

It is moreover necessary to provide good thermal insulation of the airgaps by using sealing means such as rings, sealing tabs, etc., because a degradation in the seal would in fine mean a degradation in the clearances.

Furthermore, the airgap solution makes it possible to insulate the inner wall of the internal casing locally in line with the stators, but does not fully insulate the skin of the internal casing. In particular, according to the configuration chosen, it is possible that the inner wall located facing the rotors is not insulated; the lateral walls of the internal casing, corresponding to the openings for the duct sampling, are not insulated; the outer wall of the internal casing is not insulated.

Finally, it is sometimes impossible, due to a lack of space or access difficulty, to set up such a thermal insulation system by airgap in an existing turbomachine.

There is therefore a need to optimise the thermal insulation of the skin of the internal casing of a turbomachine.

DISCLOSURE OF THE INVENTION

To meet this need, the object of the invention is an internal casing ferrule for a turbomachine, the ferrule being centred on a longitudinal central axis and being characterised in that it includes:
  a main body, that is centred on the longitudinal central axis, that includes two longitudinal ends and that is delimited by a radially internal surface and a radially external surface relative to the longitudinal central axis;
  a thermal insulation envelope, that includes:
    a lateral covering portion entirely covering the longitudinal ends of the main body;
    along a section transversal to the longitudinal central axis, an exterior covering portion entirely covering the radially external surface of the main body;
    along a section transversal to the longitudinal central axis, an interior covering portion entirely covering the radially internal surface of the main body;
    the lateral portion connecting the interior and exterior portions;
  and
  a protective envelope, that at least partially covers the thermal insulation envelope and that includes, along a section transversal to the longitudinal central axis:
    a radially external protective portion at least partially covering the exterior covering portion; and
    a radially internal protective portion at least partially covering the interior covering portion;
  and in that the thermal insulation envelope has a porous structure with a volumetric porosity greater than or equal to 50%.

Preferably, the ferrule is a monolithic part.

According to the invention, a thermal insulation envelope, which has a porous structure, entirely covers the main body, so as to insulate it thermally, and a protective envelope at least partially covers the thermal insulation envelope. In fact, the protective envelope covers the thermal insulation envelope at least on the portions of the thermal insulation envelope intended to be in contact with a flow of fluid of the turbomachine.

In the context of the present invention, the proportion of empty space (pores, i.e. the interstitial pores connected together or not) comprised in a considered zone is expressed in terms of volumetric porosity. The volumetric porosity of a zone (for example of the thermal insulation envelope) is therefore the ratio between the volume of pores of this zone and the total volume of the zone (structure+pores, i.e. the solid structure). This can be an open and/or closed porosity.

There are many methods for analysing porosity. The most often used are microtomography, ultrasound and image analysis.

The microtomography method is a non-destructive 3D analysis technique that provides a volumetric image of the distribution of the linear absorption coefficient of X rays. It is possible to obtain a 3D map of the porosities present in a material and to then calculate the volumetric percentage of the interstices.

The ultrasound method is a non-destructive technique that makes it possible, by comparing the difference in amplitude between an input signal and an output signal, to estimate a porosity, with the presence of porosity strongly disturbing the propagation of ultrasonic waves.

The image analysis method consists of enumerating the porosity on an image obtained, for example, using an optical microscope or a scanning electron microscope.

Figure 7:
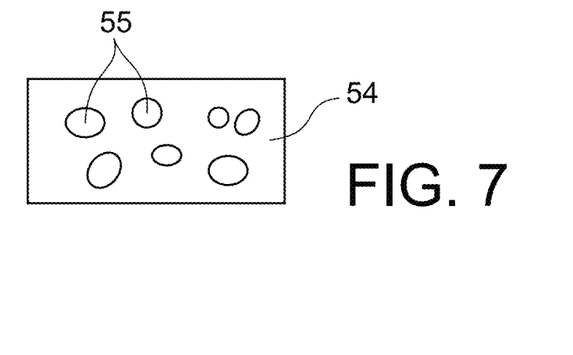
FIG. 7 shows, as a cross-section view, an example of a porous structure for the thermal insulation envelope.

In the context of the present invention, this entails a porous structure, i.e. a structure formed from a solid material and one or more cavities (generally filled with air) located internally in the solid material. An example of a porous structure is shown in FIG. 7: here there is a volume of solid material 54 within which cavities 55 are dispersed. The cavities have a minimum volume that will allow the porous structure to have the highest possible air density and at least greater than 50%, in such a way as to provide good thermal insulation of the main body.

Figure 5:
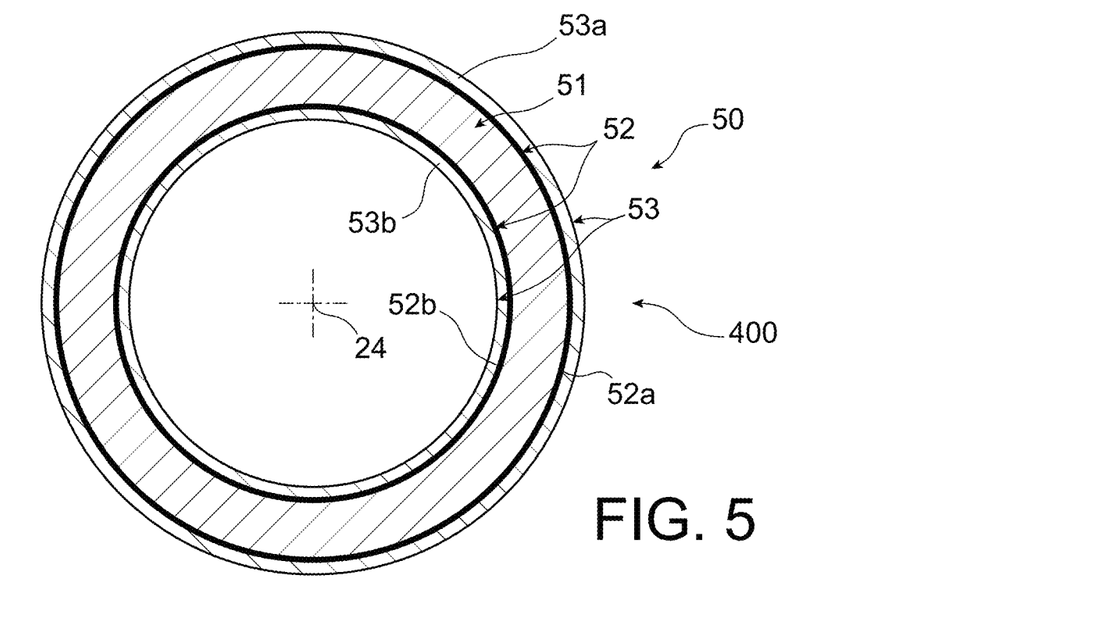
FIG. 5 is a schematic view as a transverse cross-section of an embodiment of a ferrule according to the invention.

According to a first alternative, the main body and the exterior and interior covering portions each extend over 360° around the longitudinal central axis 24. There is thus an annular ferrule, such as shown in FIG. 5.

Figure 6:
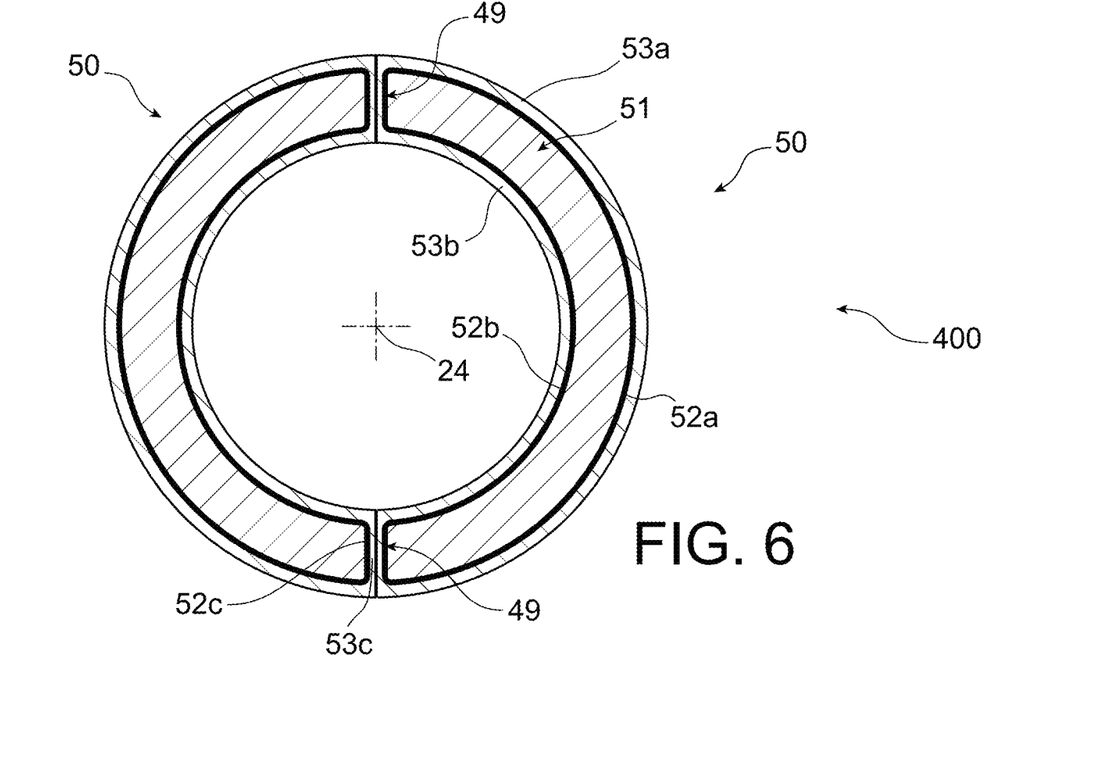
FIG. 6 is a schematic view as a transverse cross-section of another embodiment of a ferrule according to the invention.

According to a second alternative, the main body and the exterior and interior covering portions each extend around the longitudinal central axis over an identical angular sector less than 360°. There is thus a ferrule with an angular segment, such as shown in FIG. 6. Advantageously, according to this second alternative, the main body has two opposite circumferential ends and the thermal insulation envelope further includes an intermediate covering portion that connects the exterior and interior covering portions and that entirely covers each opposite circumferential end of the main body. Preferably, the protective envelope further comprises an intermediate protective portion that connects the radially external and internal protective portions and that entirely covers the intermediate covering portion.

According to an alternative, the radially external and internal protective portions of the protective envelope entirely cover, respectively, the exterior covering portion and the interior covering portion of the thermal insulation envelope. Preferably, the protective envelope entirely covers the thermal insulation envelope.

Preferably, the protective envelope has a volumetric porosity of less than 5%. The protective envelope therefore has a dense structure, which has little to no porosity. The presence of this protective envelope in the ferrule makes it possible to retain an acceptable surface state for the engine in terms of roughness, which prevents excessive losses of load in the duct and non-duct air circuits.

Advantageously, the thermal insulation envelope has a cellular structure, preferably a honeycomb cellular structure, or a lattice structure.

A cellular structure includes a plurality of cavities (the cells) delimited by walls. The cells can have all sorts of shapes, for example hexagonal, cubic, etc.

A lattice structure is a three-dimensional structure including a single cavity of which the walls are connected by a framework (pillars for example) that have the shape of a lattice.

The porosity of the cellular structure and of the lattice structure is mainly due to the cells, in one case, and to the single cavity, in the other case. The walls of the cellular and lattice structures can also be porous (for example made by powder sintering); preferably, these walls are dense and have a volumetric porosity of less than 5%, in such a way as to ensure adequate mechanical resistance of the porous structure.

According to an embodiment, the main body, the thermal insulation envelope and the protective envelope are made in a single piece by additive manufacturing to form a single-block and monolithic part.

According to an embodiment, the ferrule comprises a strip of abradable material that is integrated into the ferrule by being made directly in the protective envelope.

The object of the invention is also an internal turbomachine casing, comprising at least two ferrules such as described hereinabove, arranged axially adjacent to one another. Preferably, at least one of said ferrules of the internal casing is intended to support fixed blades.

Finally, the object of the invention is a turbomachine equipped with such an internal casing.

According to an embodiment, the turbomachine comprising movable blades, at least one ferrule comprises a strip of abradable material that is added onto said at least one ferrule in line with the movable blades.

The present invention has many advantages.

The solution proposed by the invention makes it possible to completely insulate the skin of the internal casing on all of its faces and is simple to implement, whether, on the one hand, at mounting ferrules with an angular segment in order to form an annular ferrule, or at mounting a plurality of longitudinally adjacent ferrules to form the internal casing and, on the other hand, at the manufacturing of the ferrule.

In particular, the thermal insulation of the internal casing is optimised relative to the prior art, its skin (namely its inner wall, its outer wall and its lateral walls (corresponding to the sampling zones of the flow of air)) being thermally insulated. In particular, while the solution with airgaps of the prior art did not make it possible, in the configuration where the airgaps were disposed only in line with the stators (and absent in line with the rotors), to insulate the zones between two airgaps (zones wherein the flow of heat passes via conduction), the solution proposed in the context of the invention makes this insulation possible.

Furthermore, while in the case of an insulation system by airgap according to the prior art, the leaks at the junction between the elements forming the airgap (for example the junction of the stators with the inner wall of the casing) generate an air flow that has a highly detrimental effect on the variations in clearance, the effect of such leaks with the internal casing according to the invention is no longer disturbing on the clearances. Indeed, the detrimental effect of these leaks being the increase on the response time of the internal casing, this effect no longer exists thanks to the thermal insulation envelope which is porous and the effect of which is that the core of the internal casing (i.e. the main body) is entirely thermally insulated from the outside; in other terms, the skin of the internal casing is entirely thermally insulated.

In the end, a better thermal insulation of the internal casing is obtained, which reduces the clearances during operation and therefore the specific consumption of the turbomachine. The performance of the turbomachine and its operability are thus improved.

This thermal insulation of the internal casing can furthermore have a size that is smaller than that generated by the solution with airgap (for example, in the configuration where the rectifiers are integral with the inner skin of the casing (FIG. 4)), which makes it easier to mount it in a turbomachine.

BRIEF DESCRIPTION OF THE DRAWINGS

Other aspects, purposes, advantages and characteristics of the invention shall appear better when reading the following detailed description of preferred embodiments of the latter, given as a non-limiting example, and given in reference to the accompanying drawings wherein:

FIG. 10b is an exploded view of parts of FIG. 10a;

FIG. 11b is an exploded view of parts of FIG. 11a.

DETAILED DISCLOSURE OF PARTICULAR EMBODIMENTS

Figure 1:
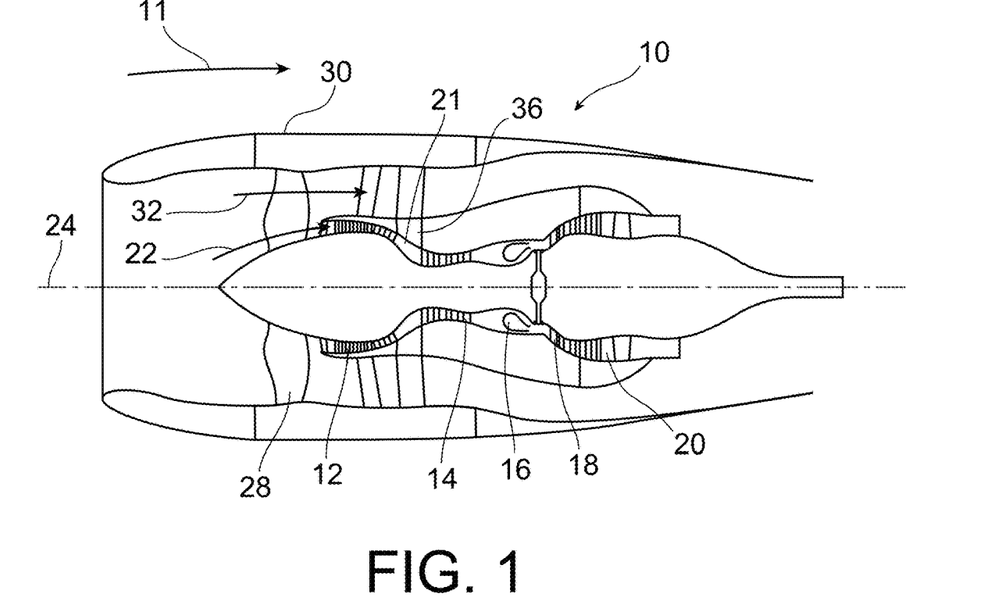
FIG. 1 shows a schematic view as an axial cross-section of an aircraft turbomachine.

In reference first of all to FIG. 1, an aircraft turbomachine 1 is shown, of the bypass turbine engine type. This turbine engine 1 includes, from upstream to downstream along the main direction of flow of the gases shown schematically by the arrow 11, a low-pressure compressor 12, a high-pressure compressor 14, a combustion chamber 16, a high-pressure turbine 18 and a low-pressure turbine 20, with these elements defining a primary duct 21 passed through by a primary flow of gas 22. The fan 28 is faired by a nacelle 30 to generate a secondary flow 32 through a secondary duct 31.

Figure 2:
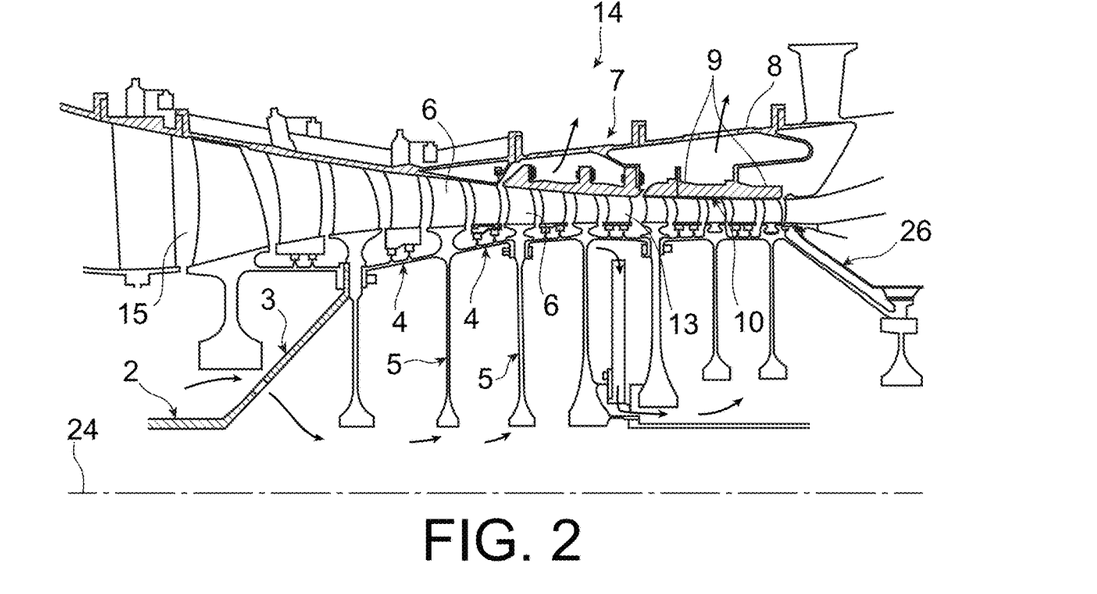
FIG. 2 is an enlarged view of the high-pressure compressor of FIG. 1.

FIG. 2 is a general view of the high-pressure compressor 14 of FIG. 1. The compressor 14 comprises a central rotor 26 driven by a line of shafts 2 and comprised of a set 3 of streamlined shape comprised of rings 4 juxtaposed and separated by discs 5 in line with stages of movable blades 6. A stator 7 surrounds the rotor 26 and comprises an external casing 8 and an internal casing 10, formed of axially juxtaposed annular ferrules 40, turned towards the rotor 1.

The internal casing 10 is used to delimit an annular duct 15 of the flow of gases wherein the primary flow of gas 22 flows and wherein the stages of movable blades 6 extend and stages of fixed blades 13 for guiding the flow extend, which are attached to the annular ferrules 40 and alternate with the stages mentioned hereinabove.

FIGS. 3 and 4 are respectively an enlarged view of the upstream portion (FIG. 3) and of the downstream portion (FIG. 4) of the stator of the compressor shown in FIG. 2, with these views showing an insulation solution of the inner wall of the internal casing 10 by airgaps according to the prior art.

In FIG. 3, the internal casing 10 is comprised of annular ferrules 40, connected together by bolts 42 clamping the flanges 41 that terminate them. These annular ferrules 40 include protrusions 43 radially inside, that open onto the duct 15 for air flow and are therefore exposed to the temperature thereof.

Support rings 44 of the fixed blades 13 make it possible to attach the fixed blades 13 to the annular ferrules 40 and to create an airgap 45. A layer of abradable material 46 is disposed on the ferrules 40 in line with the rotors 6.

In FIG. 4, the internal casing 10 is comprised of annular ferrules 40 which are in particular connected by separated seals 37 with staple section. Elements 8', 47 are attached to the annular ferrules 40 to form airgaps 45.

As can be observed, these solutions of the prior art do not allow for an optimum insulation of the internal casing (FIG. 3) and/or require many assembly parts (FIG. 4).

According to the invention, the conventional system of insulation of the internal casing obtained by airgaps is replaced with a more effective system. According to the invention, the internal casing 100 is formed from a plurality of annular parts 400 disposed axially adjacent to one another along the longitudinal axis 24 of the part (that coincides with the longitudinal axis of the turbomachine). The annular part 400 can be an annular ferrule 50 (such as shown in FIG. 5) or result from the circumferential assemblage of two or more than two ferrules 50 with an angular segment. By way of example, in FIG. 6, two ferrules with an angular segment of 180° are assembled according to their circumference in order to form an annular ferrule.

Each ferrule is a part, preferably monolithic, that has a variable porosity by zones. Thus, the ferrule 50 includes a main body 51, of which the surface is entirely covered with a layer forming a thermal insulation envelope 52, which has a porous structure and of which the function is to thermally insulate the main body 51. This thermal insulation envelope 52 thus forms around the main body 51 a porous interface that thermally insulates from the outside environment.

As shown in FIGS. 5 and 6, which show a cross-section view transverse to the longitudinal central axis 24 of a ferrule, the thermal insulation envelope 52 includes an exterior covering portion 52a, that entirely covers the radially external surface of the main body 51, as well as an interior covering portion 52b, that entirely covers the radially internal surface of the main body 51. A lateral covering portion (not visible in this cross-section view) entirely covers the longitudinal ends of the main body 51 and connects the interior and exterior portions.

The ferrule 50 also includes a protective envelope 53, that at least partially covers the thermal insulation envelope.

As shown in FIGS. 5 and 6, the protective envelope 53 includes a radially external protective portion 53a, that covers the exterior covering portion 52a, as well as a radially internal protective portion 53b, that covers the interior covering portion 52*b*. The protective envelope can be a coating layer deposited on the thermal insulation envelope.

When the ferrule is a ferrule with an angular segment, as shown in FIG. 6, the ferrule includes two opposite circumferential ends 49; the thermal insulation envelope 52 further includes an intermediate covering portion 52*c*, that entirely covers the circumferential ends 49 of the main body 51, and that connects the exterior 52*a* and interior 52*b* covering portions. As shown in FIG. 6, the covering envelope 53 includes an intermediate protective portion 53*c*, that connects the radially external 53*a* and internal 53*b* protective portions, and that entirely covers the intermediate covering portion 52*c* of the thermal insulation envelope 52.

The protective envelope 53 is preferably dense, with a volumetric porosity of at most 5% (limit excluded).

Preferably, the thermal insulation envelope 52 is located close to the interfaces with the air and is therefore close to the skin of the ferrule.

The thermal insulation envelope 52 has to have a good compromise between volumetric porosity, mechanical resistance and expansion coefficient. The inventors have observed that the lattice structures and the honeycomb cellular structures were able to provide all these functions.

The thermal insulation envelope 52 can thus have a lattice structure, i.e. a rigid structure that consists in an open skeleton or framework, formed of connection members, for example of the bar, beam or similar type, which can be straight or curved and which are in contact, intersect or overlap according to a repetitive pattern in three dimensions. The repetitive pattern can for example be a cube, a hexagon, a pyramid, a sphere, etc. and the lattice will then be formed of interconnected cubes, interconnected hexagons, interconnected pyramids, interconnected spheres, etc.

Figure 8A:
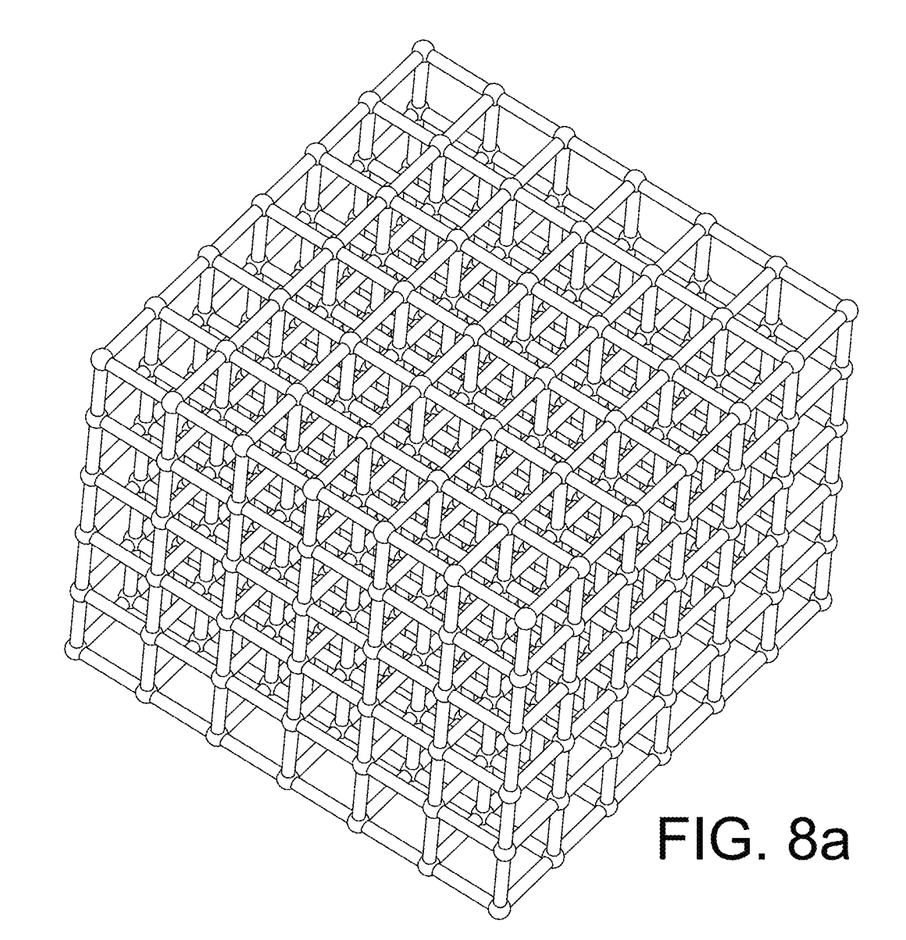
FIGS. 8a and 8b show examples of a lattice structure.
Figure 8B:
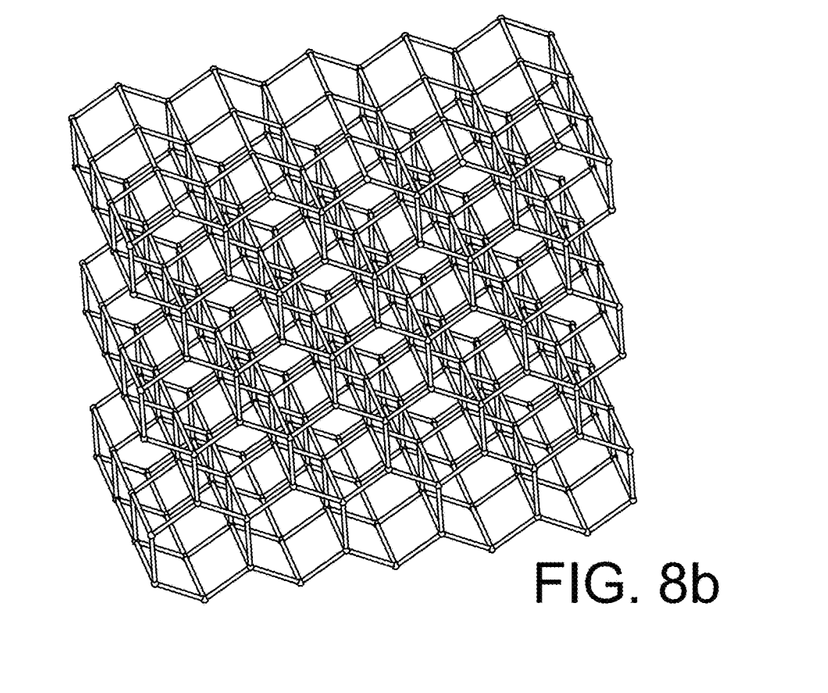

FIGS. 8*a* and 8*b* show possible examples of lattice structures: with a cubic pattern (FIG. 8*a*) and with a hexagonal pattern (FIG. 8*b*).

Figure 9:
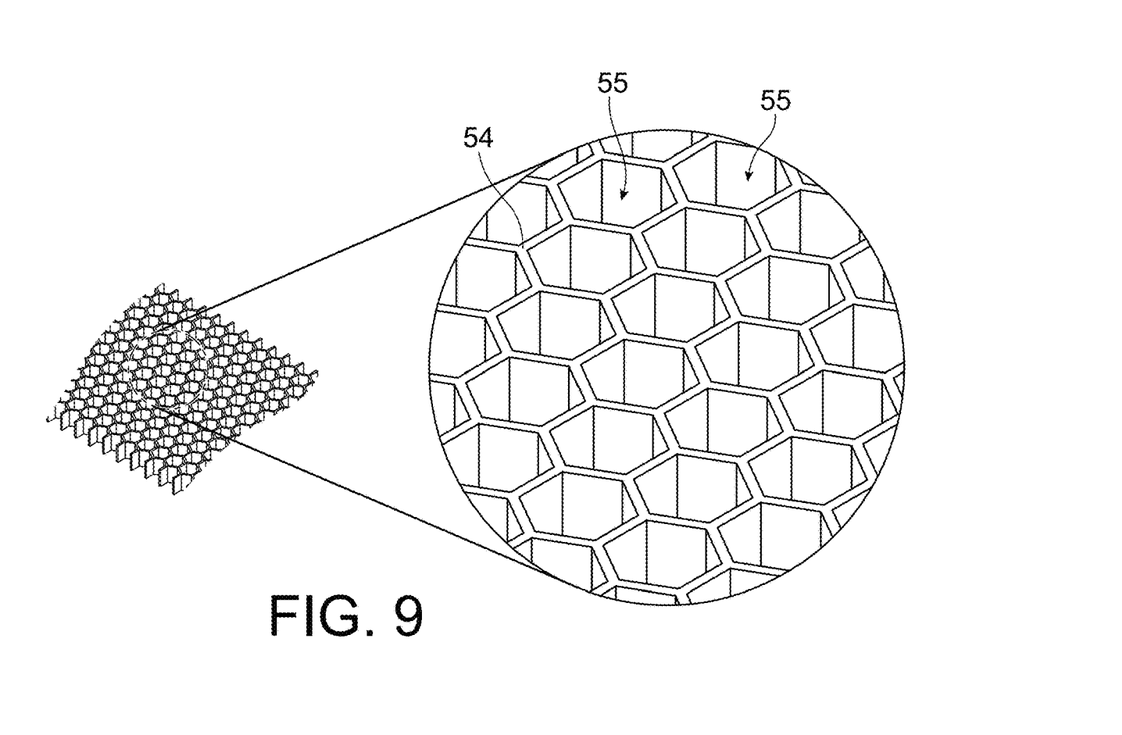
FIG. 9 shows an example of a cellular structure.

The thermal insulation envelope 52 can also have a cellular structure, of which the repetitive pattern can have a polygonal shape, for example triangular, square, rectangular, hexagonal etc. FIG. 9 shows an example of a honeycomb structure with hexagonal-shaped cells. The cells form empty cavities 55 and the walls 54 of these cells form the solid material of the porous structure.

In thermodynamics, the role of the main body 51 is to provide a thermal inertia to the skin of the internal casing, allowing it to react more slowly during a change in the thermal conditions in the duct. In mechanics, its role is to guarantee a rigidity of all the skin of the internal casing under the effects of pressure (duct in particular) and forces due to thermodynamics to guarantee low displacements.

In thermodynamics, the function of the thermal insulation envelope 52 is to thermally insulate the main body 51 from the exterior surface of the internal casing. It therefore has a porosity less than that of the main body. Preferably, the main body has a dense structure, i.e. has little to no porosity, preferably with a volumetric porosity of less than 5%.

In mechanics, the role of the thermal insulation envelope 52 is to render integral the various elements of the ferrule, namely the inner (the main body 51) and the outer (i.e. the skin, that can be formed by the protective envelope 53). It must therefore respect certain constraints of rigidity (an excessive deformation would be detrimental for the clearances). The choice of the type and of the extent of the porosity of the thermal insulation envelope 52 is therefore a compromise between thermal and mechanical performance.

The thermal insulation envelope 52 is at least partially physically separated from the exterior surface (i.e. the skin) of the internal casing by the protective envelope 53, at least on the portions of the thermal insulation envelope intended to be in contact with a fluid flow of the turbomachine. This protective envelope 53 is thus used as a physical barrier between the thermal insulation envelope 52 and the exterior surface of the ferrule; preferably, this protective envelope 53 has little to no porosity (preferably a volumetric porosity of less than 5%). Indeed, a porous surface would be rough, which is detrimental for the aerodynamics (and the yield), in particular regarding the interface with the duct, but also for the losses of loads in the casing cavities of which the air is often used, in the case of the compressor, for sampling to the rest of the engine and of the aircraft (cooling of turbines, pressurisation of the cabin of the aircraft, etc.).

A portion of the protective envelope 53 can be intended to be facing an upper blade platform, possibly through an abradable.

The main body 51, the thermal insulation envelope 52 (that entirely covers the surface of the main body) and the protective envelope 53 (that partially or totally covers the thermal insulation envelope) can be made in a single piece so as to obtain a single-block and monolithic part, which has the advantage of avoiding assembly steps. This is possible by using the technique of additive manufacturing. This makes it possible to replace a complex solution of insulating the skin of the internal casing by airgaps with a simple more effective solution with simplified mounting, that has a reduced number of required parts and possibly with a reduced size.

The techniques of additive manufacturing make it possible to manufacture three-dimensional parts, with complex geometries, from resistant materials, while still setting up a porosity zone that is optimised for searching for an optimum in mechanical behaviour. The manufacturing technique is well known and will not be described in detail. It groups together in particular the methods of stereolithography, selective laser sintering, fused wire deposition, laser fusion, etc.

Selective laser sintering uses a high-power laser to sinter small particles of plastic, metal or ceramic until the three-dimensional part to be formed is obtained. In the scope of the invention, metallic materials (metal or alloy) or ceramic materials will be used.

Fused wire deposition makes use of a temporary transition from a solid material to a liquid state, generally by heating; the material is generally applied to a desired location using an extrusion nozzle.

The different zones of the ferrule 50 according to the invention can be made from any material compatible with additive manufacturing, that is able to provide sufficient rigidity at the zone concerned and compatible with the expected use of the ferrule (in particular in terms of mechanical resistance and heat). These different zones of the ferrule (main body, thermal insulation envelope and protective envelope) can thus be made of metallic and/or ceramic materials. For example, stainless steel, nickel alloys, titanium alloys, etc. can be used. These zones can be made from different or identical materials.

Figure 10A:
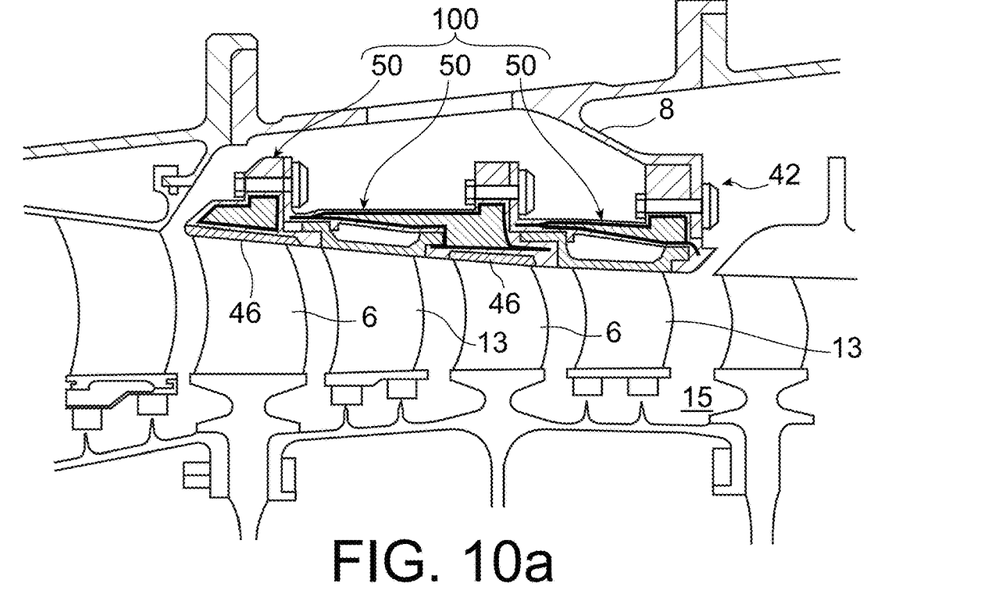
FIG. 10a is a view of the upstream portion of the stator of the compressor having a thermal insulation of the internal casing according to the invention.
Figure 10B:
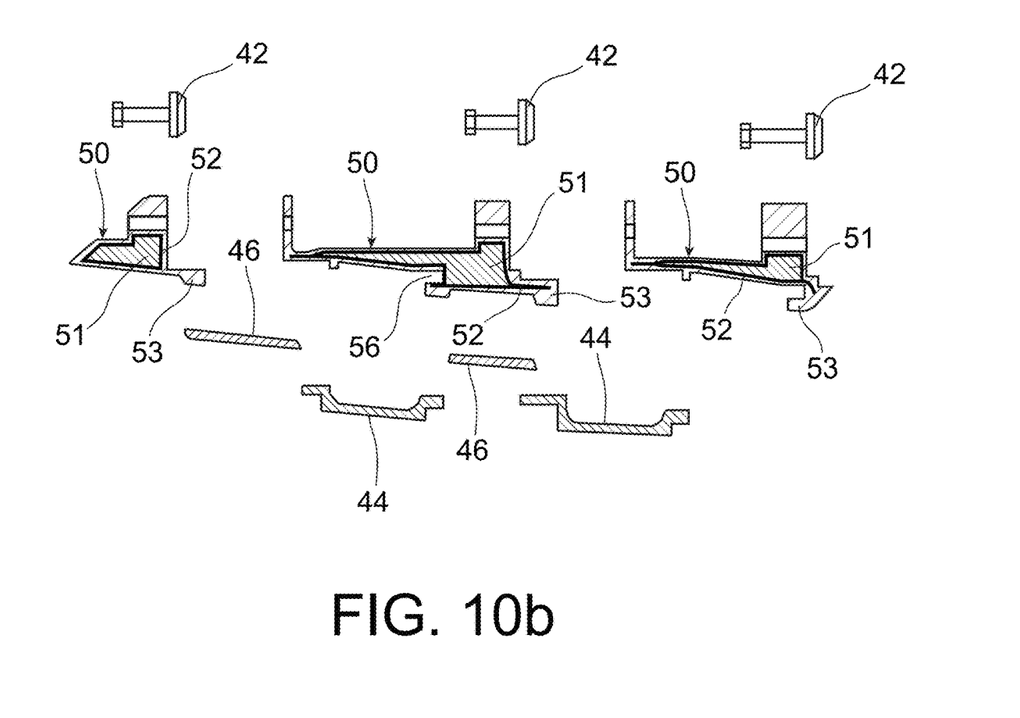
Figure 11A:
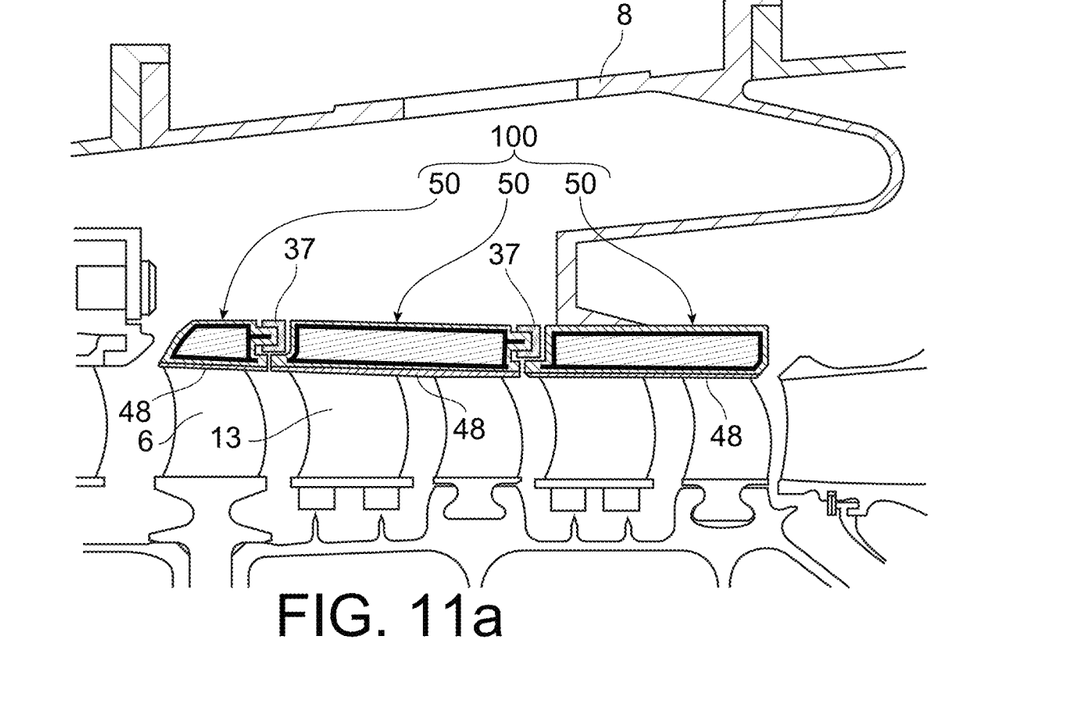
FIG. 11a is a view of the downstream portion of the stator of the compressor having a thermal insulation of the internal casing according to the invention.
Figure 11B:
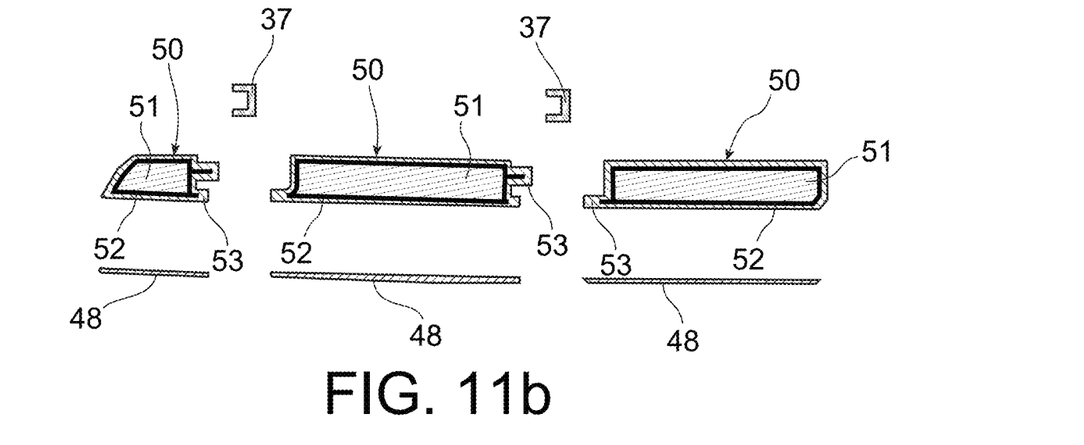

Two examples of internal casing of which the skin is insulated according to the invention are shown in FIGS. 10*a* and 11*a*. As can be seen in FIGS. 10*b* and 11*b*, which are exploded views of FIGS. 10*a* and 11*a*, annular parts (which are annular ferrules 50 or ferrules 50 with an angular segment) are connected to one another by seals 37 or are provided with flanges and connect to one another by bolts 42. The ferrules can be formed from a single part (annular ferrule, as shown in FIG. 6) or from the assembly of several ferrules with an angular segment circumferentially connected (FIG. 7).

In FIGS. 10a and 10b, a circular strip of abradable material 46 is added onto the ferrules 50 in line with the movable blades 6. This strip 46 can be added onto, or be integrated into, the ferrule by being made directly in the protective envelope 53.

In FIGS. 11a and 11b, a sealing tab 48 is added onto the protective envelope 53 over the entire inner surface of the ferrules 50 in order to ensure the seal.

According to an alternative shown by the reference 56 in FIGS. 10a and 10b, the protective envelope 53 can partially cover the thermal insulation envelope 52. This is possible when the non-covered surface of the thermal insulation envelope 52 is intended to be covered by another part (here by the hook 44 used as an attachment of the fixed blades 13), which allows the thermal insulation envelope 52 even so to exert its thermal insulation function of the main body 51.

REFERENCE MENTIONED

[1] EP 1 059 420

What is claimed is:

1. An internal casing ferrule for a turbomachine, the ferrule being centred on a longitudinal central axis, wherein the internal casing ferrule is a monolithic part having different zones with:
   a first zone forming a main body, that is centred on the longitudinal central axis, that includes two longitudinal ends and that is delimited by a radially internal surface and a radially external surface relative to the longitudinal central axis;
   a second zone forming a thermal insulation envelope, that includes:
      a lateral covering portion entirely covering the longitudinal ends of the main body;
      along a section transversal to the longitudinal central axis, an exterior covering portion entirely covering the radially external surface of the main body;
      along a section transversal to the longitudinal central axis, an interior covering portion entirely covering the radially internal surface of the main body;
      the lateral portion connecting the interior and exterior portions; and
   a third zone forming a protective envelope, that at least partially covers the thermal insulation envelope and that includes, along a section transversal to the longitudinal central axis:
      a radially external protective portion at least partially covering the exterior covering portion; and
      a radially internal protective portion at least partially covering the interior covering portion;
   and wherein the thermal insulation envelope has a porous structure with a volumetric porosity greater than or equal to 50%.

2. The ferrule according to claim 1, wherein the main body and the exterior and interior covering portions each extend over 360° around the longitudinal central axis.

3. The ferrule according to claim 1, wherein the main body and the exterior and interior covering portions each extend around the longitudinal central axis over an identical angular sector less than 360°.

4. The ferrule according to claim 3, wherein the main body has two opposite circumferential ends and the thermal insulation envelope further includes an intermediate covering portion that connects the exterior and interior covering portions and that entirely covers each opposite circumferential end of the main body.

5. The ferrule according to claim 4, wherein the protective envelope further comprises an intermediate protective portion that connects the radially external and internal protective portions and that entirely covers the intermediate covering portion.

6. The ferrule according to claim 1, wherein the radially external and internal protective portions of the protective envelope entirely cover, respectively, the exterior covering portion and the interior covering portion of the thermal insulation envelope.

7. The ferrule according to claim 1, wherein the protective envelope has a volumetric porosity of less than 5%.

8. The ferrule according to claim 1, wherein the thermal insulation envelope has a cellular structure.

9. The ferrule according to claim 1, wherein the main body, the thermal insulation envelope and the protective envelope are made in a single piece by additive manufacturing to form a single-block and the monolithic part.

10. The ferrule according to claim 1, comprising a strip of abradable material that is integrated into the ferrule by being made directly in the protective envelope.

11. An internal turbomachine casing, comprising at least two ferrules according to claim 1, arranged axially adjacent to one another.

12. A turbomachine equipped with the internal casing according to claim 11.

13. The turbomachine according to claim 12, comprising movable blades and wherein at least one of the ferrules comprises a strip of abradable material that is added onto said at least one ferrule in line with the movable blades.

* * * * *